No. 650,614. Patented May 29, 1900.
A. ROESELER.
FLOWER POT.
(Application filed Feb. 21, 1899.)
(No Model.)
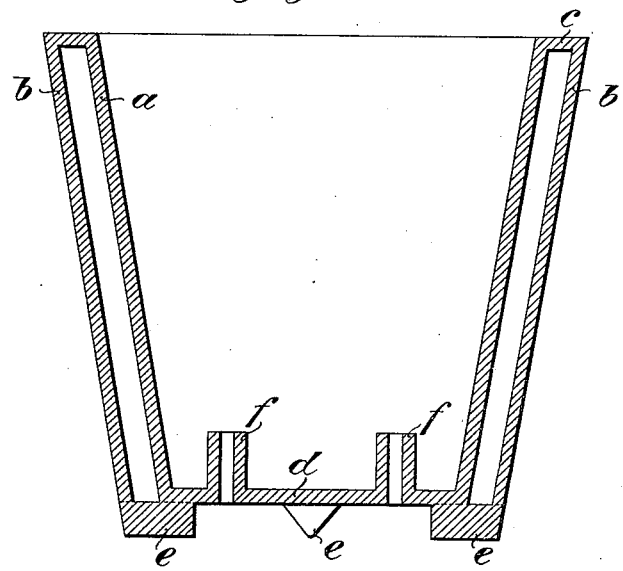
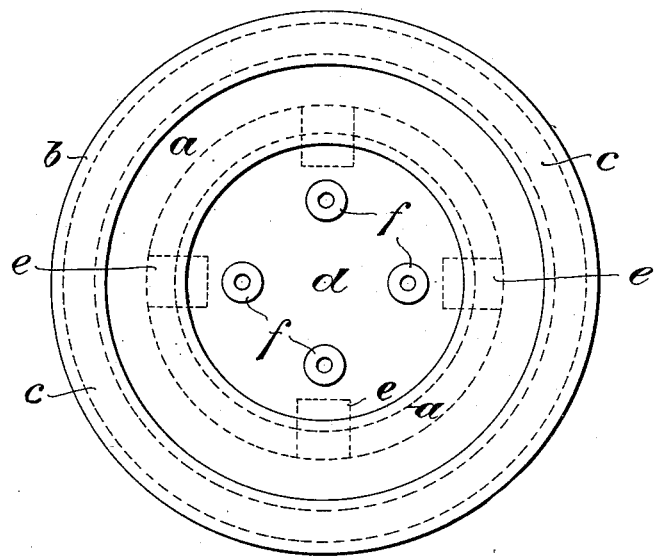
WITNESSES:
INVENTOR
Alexander Roeseler
BY Richardson Co
ATTORNEYS

UNITED STATES PATENT OFFICE.

ALEXANDER ROESELER, OF BERLIN, GERMANY.

FLOWER-POT.

SPECIFICATION forming part of Letters Patent No. 650,614, dated May 29, 1900.

Application filed February 21, 1899. Serial No. 706,403. (No model.)

*To all whom it may concern:*

Be it known that I, ALEXANDER ROESELER, a subject of the King of Prussia, German Emperor, residing at Französirchestrasse 17, Berlin, W., Prussia, German Empire, have invented certain new and useful Improvements in Flower Pots and Vases, of which the following is a specification.

The present invention relates to flower pots and vases and the like; and it consists in providing these receptacles with double walls inclosing a stagnant layer of air and in providing the bottoms of the same with inwardly and upwardly extending tubes or pipes instead of the ordinary orifices hitherto employed.

In order to render the present specification more easily intelligible, reference is had to the accompanying drawings, in which similar letters of reference denote similar parts throughout both views.

Figure 1 is a vertical section through the pot, and Fig. 2 is a plan view of the same.

The pot or vase is provided with double walls $a$ and $b$, closed at the top by an annular ring $c$ and open at the bottom, which closes up the inner wall only. The pot itself is provided with feet $e\ e\ e$, any desired number of which may be employed, and inwardly-extending tubes $f f$ are arranged in the said bottom $d$, so that all the water fed to the contents of the pot will not at once escape, as is the case with the ordinary flower-pots; but a certain quantity will remain, which may then be absorbed by the earth in case the flower or other plant in the pot may at any time not have been watered by inadvertence or from any other cause. The tubes $f f$ constitute overflow-pipes.

The effect produced by the double-walled pot is that the roots of the plants therein will not be subjected to sudden changes of temperature, because the stagnant layer of air within the walls constitutes a bad conductor of heat, and thus compensates sudden temperature changes.

In the present invention particular importance is attached to the fact that no air circulation is possible between the walls, owing to the space being closed at the top, because if this were not the case the air-cushion would always have approximately the same temperature as the outer air, and the roots of the plant would not be protected in the manner above described—*i. e.*, changes of temperature without would not be compensated by the stagnant layer of air between the walls.

The material of which the pots or vases are constructed may be of any desired kind.

By means of the pipes $f f$ air will be able to pass upwardly into the earth contained in the pot and the said earth may from time to time be pierced by a needle or pointed instrument inserted through the tubes $f f$, so as to loosen it. The water fed to the plant will not run out at the bottom entirely, as has been hitherto the case, but a certain supply will remain in the pot, which will be absorbed by the earth when necessary.

I claim as my invention—

A flower-pot having double walls $a, b$, joined at the top and open at the bottom to inclose a layer of stagnant air and a series of inwardly-extending overflow-pipes $f$ arranged in the bottom of the pot, substantially as described.

Signed at Berlin, Germany, this 7th day of February, 1899.

ALEXANDER ROESELER.

Witnesses:
 WOLDEMAR HAUPT,
 WILLIAM MAYNER.